J. C. YOUNGBLOOD.
SECTIONAL DEMOUNTABLE RIM.
APPLICATION FILED FEB. 11, 1919.
1,314,110.
Patented Aug. 26, 1919.
2 SHEETS—SHEET 2.
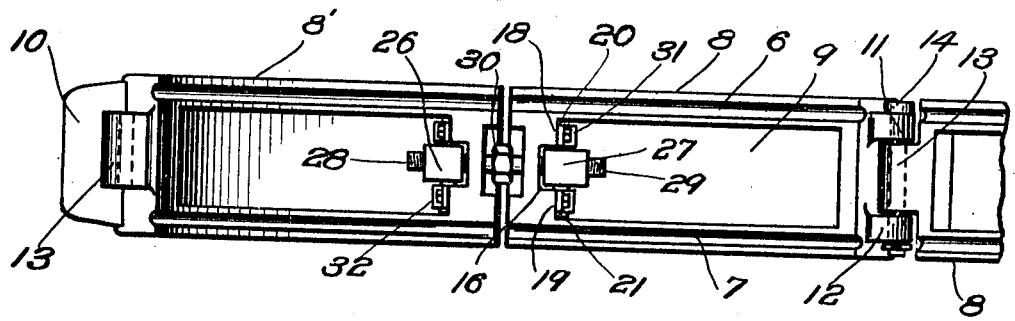
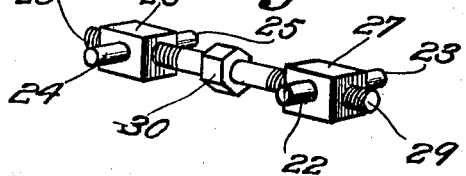
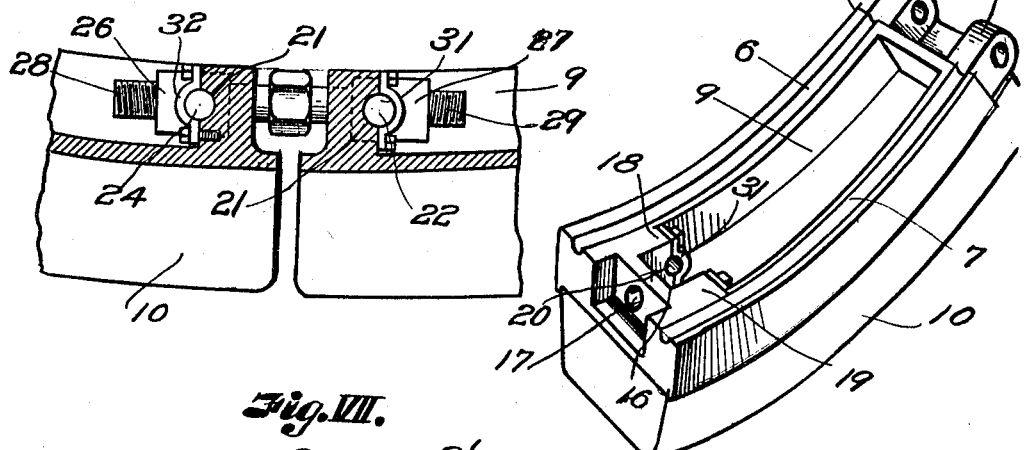
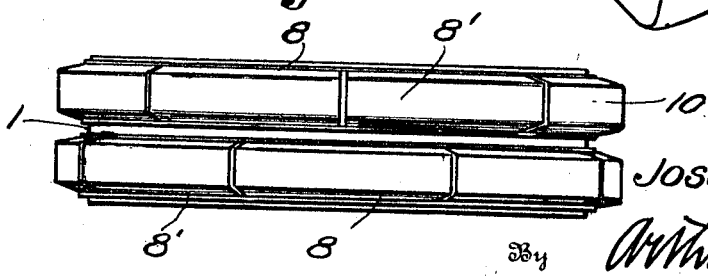
Inventor
Joseph C. Youngblood
By Arthur C. Brown
Attorney

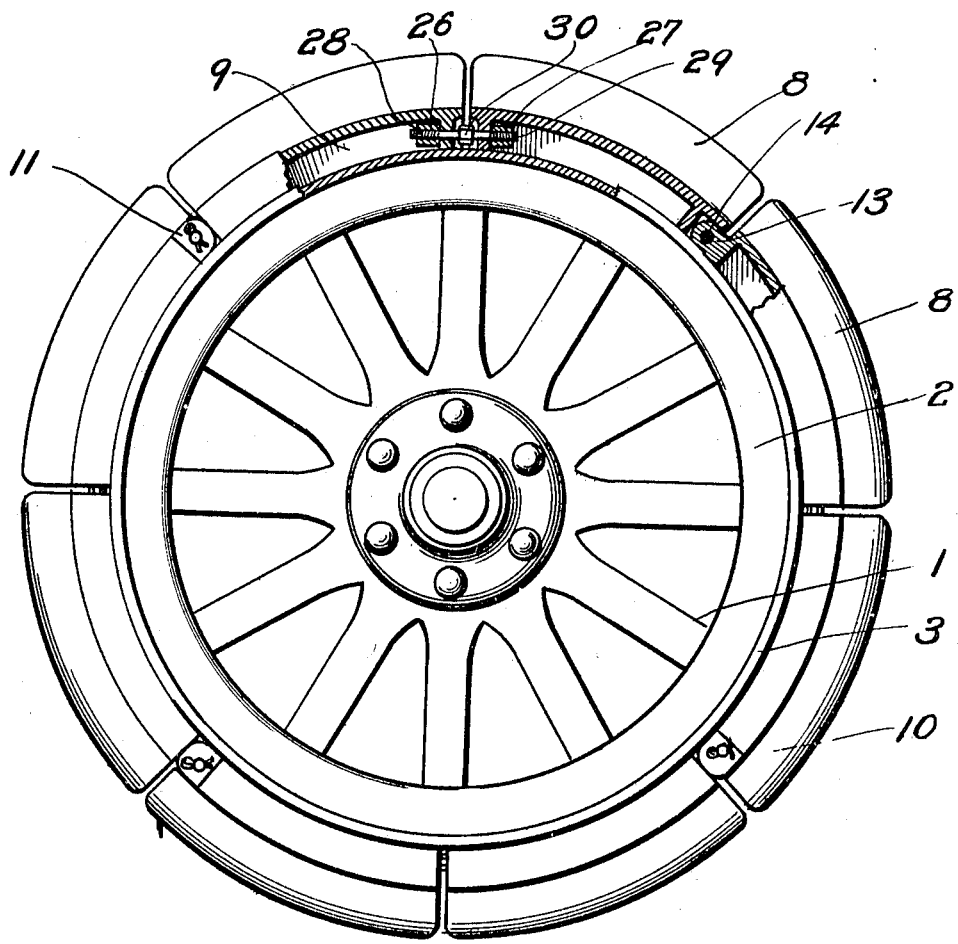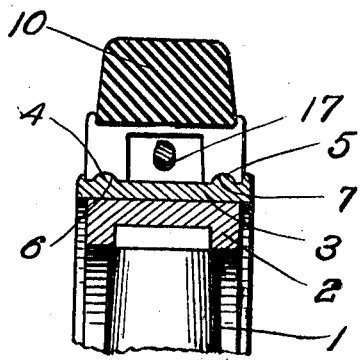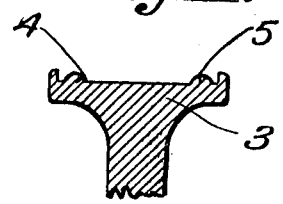

UNITED STATES PATENT OFFICE.

JOSEPH C. YOUNGBLOOD, OF ATWOOD, KANSAS.

SECTIONAL DEMOUNTABLE RIM.

1,314,110.  Specification of Letters Patent.  Patented Aug. 26, 1919.

Application filed February 11, 1919. Serial No. 276,300.

*To all whom it may concern:*

Be it known that I, JOSEPH C. YOUNGBLOOD, a citizen of the United States, residing at Atwood, in the county of Rawlins and State of Kansas, have invented certain new and useful Improvements in Sectional Demountable Rims; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to demountable rims for vehicle wheels and particularly to a section block demountable rim. comprising connected tire-carrying segments with means for drawing adjacent segment ends together, and the device is equally adapted for use in connection with the wooden fellied wheel or one in which the felly and tire-receiving rim constitute a single part. The device is also adapted to be used in connection with a dual tread wheel for heavy trucks and the like.

One of the objects of the invention is to provide an inexpensive and efficient means for attaching and detaching a tire to a wheel rim or felly as well as to provide means whereby worn sections may be readily removed and others substituted therefor.

The invention also contemplates the provision of means for easily assembling the parts and for making quick repairs when necessary.

In the drawings,

Figure I is a side elevational view, partly in section, of a rim and tire constructed in accordance with my invention and applied to a wheel.

Fig. II is a sectional view through the felly of a wheel, a rim and a detachable tire section.

Fig. III is a plan view of a plurality of tire sections connected together.

Fig. IV is a detail perspective view of the connecting tension screw and journal-engaging blocks connected to the end thereof.

Fig. V is a sectional view through the ends of two adjacent sections.

Fig. VI is a detail perspective view of one of the tire sections.

Fig. VII is an edge view of a dual tread wheel to which my invention is applied, and Fig. VIII is a sectional view of the rim of a metal wheel.

Referring now to the drawings by numerals of reference:

1 designates a wheel of usual construction provided with a felly 2 having a metal rim 3 embracing the perimeter thereof and provided with groove-engaging ribs 4 and 5 which are received by the grooves 6 and 7 of the tire sections, one of which is illustrated in detail in Fig. VI and designated 8. Each tire section consists of an elongated segmental box-like member having a recess 9 to reduce weight and each section carries a segment 10 of rubber or similar material which constitutes a tread section of the tire. On the end of each alternate segment are longitudinally projecting out-standing ears 11 and 12 which are adapted to receive a tongue 13 on an adjacent alternating tire section 8', the tongue and ears being connected together by bolts 14 having heads on one end and fastened by cotter pins or similar devices at their other ends whereby the segmental members may be connected in pairs. At one end of each segmental block 8 or 8', as the case may be, is a block-receiving recess 16 to receive blocks adjacent to the elongated opening 17 in the end of the segment, the recess 16 being of less width than the recess 9 so that shoulders 18 and 19 are formed, provided with semi-circular bearings 20 and 21 in which rock the journals or bearing pins 22 and 23 or 24 and 25 of the tension screw-receiving block 26 or 27, as the case may be. The construction of the blocks and tension device is best shown in Figs. IV and V in which it will be noticed that the ends 28 and 29 of the tension device are threaded to engage corresponding threads in the blocks 27 and 28 and that intermediate the threaded ends is provided a polygonal collar or nut 30 whereby the oppositely threaded ends 28 and 29 may draw the blocks together to decrease the diameter of the tire to cause it to bind upon the rim, the action of the tension device being assisted by the fact that the pins 22 to 25, both inclusive, are swiveled in bearings and that the tension device projects through elongated openings so that it will have ample play in operation and eliminate liability of binding. The swivel pins 22 and 23 are held against accidental displacement by a pair of bearing straps 31, while the members 24 and 25 are held in place by bearing straps 32.

In applying the invention, the rim 3 may be shrunk upon the felly 2 and the sections connected together so that the tire will be of greater diameter than the outer diameter of the rim, whereupon the sections may be slipped over the rim so that the ribs 4 and 5 engage the grooves 6 and 7. A wrench may then be used to rotate the nut 30 so as to draw the tire sections evenly upon the rim 3 whereupon the tire will be secured in place, it being obvious that liability of detachment by side thrust will be eliminated on account of the ribs 4 and 5.

The tire may also be applied by taking out one of the bolts 14 and fitting the tire over the rim, the tire having an inner diameter slightly in excess of the outer diameter of the rim whereupon the tire may be drawn up on the rim as above described.

In the event that a metal wheel is used, the wheel will be so constructed that the rim will partake of the construction shown in Fig. VIII.

In Fig. VII I have shown a modified form of wheel in which a dual tread is provided, the segments 8 and 8' being arranged in parallel rows with the segments alternating in stepped relation. In other respects, the wheel shown in Fig. VII will conform to the wheel heretofore described.

Changes in form, proportion and minor details in the construction of the invention are to be resorted to without departing from the spirit of the invention or sacrificing any of its advantages, so I do not wish to be understood as limiting myself to the exact details shown but reserve the right to vary the construction as contemplated by the following claims.

Having thus described my invention, what I claim as new therein, and desire to secure by Letters-Patent is:

1. A sectional tire for wheels comprising segments having longitudinal grooves for engaging ribs on the rim of the wheel, said segments being spaced apart, blocks journaled in said segments, and turning screws projecting through the ends of the segments and engaging the blocks.

2. A sectional tire for wheels comprising a rim consisting of segments having rubber treads, the segments having recesses in their inner faces, threaded blocks journaled in said recesses, and a tension screw between the ends of adjacent segments and engaging said blocks.

3. A sectional wheel tire comprising detachable segmental members having rubber treads, pairs of segments being detachably hinged together at each one of its ends, the opposite end to each segment having a block receiving recess with an elongated opening communicating through the end of the segment, blocks journaled in the recessed ends of the segments, and a tension screw connecting pairs of blocks to draw the tire segments one toward the other.

4. A sectional tire for wheels comprising segments, each having longitudinal rib-engaging grooves along the respective side edges of its inner curved face, a recessed perforate wall carried by one end of the segment, and a hinge member carried by the other end of the segment.

5. A sectional tire for wheels comprising segments, each having longitudinal rib-engaging grooves along the respective side edges of its inner curved face and a tread-engaging groove on the outer curved face, a recessed perforate wall at one end of the segment, and a hinge member at the other end of the segment.

In testimony whereof I affix my signature.

JOSEPH C. YOUNGBLOOD.

Copies of this patent may be obtained for five cents each, by addressing the "Commissioner of Patents, Washington, D. C."